US007192899B2

(12) United States Patent
Komatsu

(10) Patent No.: US 7,192,899 B2
(45) Date of Patent: Mar. 20, 2007

(54) SILICON NITRIDE SINTERED BODY HAVING HIGH HEAT CONDUCTIVITY AND SILICON NITRIDE STRUCTURAL ELEMENT

(75) Inventor: Michiyasu Komatsu, Yokohama (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 89 days.

(21) Appl. No.: 11/350,020
(22) Filed: Feb. 9, 2006

(65) Prior Publication Data
US 2006/0128552 A1 Jun. 15, 2006

Related U.S. Application Data

(63) Continuation of application No. PCT/JP05/009127, filed on May 19, 2005.

(30) Foreign Application Priority Data
May 20, 2004 (JP) ............................. 2004-150572

(51) Int. Cl.
C04B 35/587 (2006.01)
(52) U.S. Cl. .................................... 501/97.2; 501/97.3
(58) Field of Classification Search ............... 501/97.1, 501/97.2, 97.3
See application file for complete search history.

(56) References Cited

U.S. PATENT DOCUMENTS

| 4,143,107 A | 3/1979 | Ishii et al. |
| 4,327,187 A | 4/1982 | Komatsu et al. |
| 4,407,970 A | 10/1983 | Komatsu et al. |
| 4,407,971 A | 10/1983 | Komatsu et al. |
| 4,412,009 A | 10/1983 | Komatsu et al. |

(Continued)

FOREIGN PATENT DOCUMENTS

JP 6-135771 5/1994

(Continued)

*Primary Examiner*—Karl Group
(74) *Attorney, Agent, or Firm*—Oblon, Spivak, McClelland, Maier & Neustadt, P.C.

(57) ABSTRACT

A silicon nitride sintered body exhibiting a high heat conductivity, the silicon nitride sintered body includes a rare earth element in an amount of 2 to 17.5 mass % in terms of the oxide thereof, Fe in an amount of 0.07 to 0.5 mass % in terms of the oxide thereof, Ca in an amount of 0.07 to 0.5 mass % in terms of the oxide thereof, Al in an amount of 0.1 to 0.6 mass % in terms of the oxide thereof, Mg in an amount of 0.3 to 4 mass % in terms of the oxide thereof, and Hf in an amount not larger than 5 mass % (including 0 mass %) in terms of the oxide thereof.

13 Claims, 6 Drawing Sheets

1 μm

U.S. PATENT DOCUMENTS

| | | | |
|---|---|---|---|
| 4,511,525 A | 4/1985 | Tsuge et al. | |
| 4,713,302 A | 12/1987 | Komatsu | |
| 4,879,263 A | 11/1989 | Komeya et al. | |
| 4,902,653 A | 2/1990 | Komatsu et al. | |
| 4,911,870 A | 3/1990 | Komatsu et al. | |
| 5,098,872 A | 3/1992 | Suyama et al. | |
| 5,178,647 A | 1/1993 | Komatsu et al. | |
| 5,439,856 A | 8/1995 | Komatsu | |
| 5,635,431 A | 6/1997 | Ikeda et al. | |
| 5,744,410 A * | 4/1998 | Komatsu et al. | 501/97.2 |
| 6,242,374 B1 | 6/2001 | Komatsu | |
| 6,642,165 B2 | 11/2003 | Miyashita et al. | |
| 6,784,131 B2 * | 8/2004 | Komatsu et al. | 501/97.1 |
| 6,797,660 B2 | 9/2004 | Komatsu | |
| 6,846,765 B2 * | 1/2005 | Imamura et al. | 501/97.2 |

FOREIGN PATENT DOCUMENTS

| | | |
|---|---|---|
| JP | 7-48147 | 2/1995 |
| JP | 2000-34172 | 2/2000 |
| JP | 2003-40677 | 2/2003 |
| JP | 2003-95747 | 4/2003 |

* cited by examiner

SILICON NITRIDE SINTERED BODY HAVING HIGH HEAT CONDUCTIVITY AND SILICON NITRIDE STRUCTURAL ELEMENT

CROSS-REFERENCE TO RELATED APPLICATIONS

This is a Continuation Application of PCT Application No. PCT/JP2005/009127, filed May 19, 2005, which was published under PCT Article 21(2) in Japanese.

This application is based upon and claims the benefit of priority from prior Japanese Patent Application No. 2004-150572, filed May 20, 2004, the entire contents of which are incorporated herein by reference.

BACKGROUND OF THE INVENTION

1. Field of the Invention

The present invention relates to a silicon nitride sintered body having a high heat conductivity and to a structural element using a silicon nitride sintered body such as an insulating substrate used for forming a semiconductor device and various radiators.

2. Description of the Related Art

A ceramic sintered body containing silicon nitride as a main component can exhibit excellent resistance to heat and excellent resistance to thermal shock even under a high temperature environment not lower than 800° C. Therefore, it is attempted to use the ceramic sintered body noted above for forming various parts having a high strength and a high heat-resistant as a high temperature structural element. The ceramic sintered body containing silicon nitride as a main component also exhibits high corrosion resistance relative to a metal and, thus, it is attempted to use the sintered body noted above as a melting-resistant material of a vessel handling a molten metal. Further, the ceramic sintered body in question exhibits high resistance to abrasion and, thus, it is attempted to use the sintered body in a sliding member such as a bearing and in a cutting tool.

The known silicon nitride ceramic sintered body is prepared by, for example, adding a sintering agent such as an oxide of a rare earth element, e.g., yttrium oxide, or aluminum oxide to silicon nitride. In the conventional silicon nitride ceramic sintered body, the sintering properties are enhanced by the sintering agent noted above so as to densify and strengthen the sintered body.

Also, the conventional silicon nitride ceramic sintered body is manufactured by adding the sintering agent noted above to the silicon nitride powder, followed by molding the resultant mixture and then sintering the molded material at temperatures of about 1,700 to 1,850° C. for a prescribed time and subsequently cooling the sintered body in a furnace.

However, the silicon nitride ceramic sintered body manufactured by the conventional method described above, which was certainly excellent in mechanical strength, heat resistance and oxidation resistance, was not satisfactory in heat conductivity. Under the circumstances, it was highly required to develop a silicon nitride ceramic sintered body, which exhibits high heat conductivity as well as high mechanical strength, high heat resistance and high oxidation resistance.

In responce to the requirement noted above, the present inventors conducted extensive research on the raw materials, compositions and sintering methods of silicon nitride materials so as to propose previously a silicon nitride sintered body that exhibits a marked improvement in heat conductivity and a method of manufacturing the same in, for example, Japanese Patent Disclosure (Kokai) No. 7-48174, Japanese Patent Disclosure No. 6-135771 and Japanese Patent Disclosure No. 2000-34172 so as to arrive at the practical use of the silicon nitride sintered body as a substrate for a semiconductor device.

In the technology proposed in each of the three patent documents quoted above, the silicon nitride sintered body is allowed to exhibit high heat conductivity by decreasing the content of the impurity cationic element in the silicon nitride sintered body.

To be more specific, in the silicon nitride sintered body proposed in Japanese Patent Disclosure No. 7-48174 and Japanese Patent Disclosure No. 6-135771, a high heat conductivity not lower than 60 W/m·K is achieved by lowering the content of the sum of the impurity cationic elements of Fe, Mg, Ca, Sr, Ba, Mn, B, Li, Na and K to 0.3% by weight or less.

In contrast, in the silicon nitride sintered body disclosed in Japanese Patent Disclosure No. 2000-34172, a high heat conductivity not lower than 70 W/m·K, is achieved by lowering the content of the sum of the impurity cationic elements of Al, Li, Na, K, Fe, Ba, Mn and B to 0.3% by weight or less.

However, the silicon nitride sintered body disclosed in the three patent documents quoted above is not satisfactory in oxidation resistance at temperatures falling within a range of 800° C. to 1,000° C. so as to make it necessary to further improve the silicon nitride sintered body in order to use the silicon nitride sintered body as a material of a structural element having a corrosion resistant at high temperature. In addition, the silicon nitride sintered body disclosed in the patent documents quoted above leaves room for further improvement in terms of the manufacturing cost because, in order to decrease the content of the impurity cationic element in the silicon nitride sintered body, it is necessary to use a fine silicon nitride powder of a high purity.

BRIEF SUMMARY OF THE INVENTION

An object of the present invention, which has been achieved in view of the situation described above, is to provide a silicon nitride sintered body excellent in any of room temperature strength, heat conductivity and oxidation resistance at temperatures falling within a range of 800° C. to 1,000° C. and to provide a silicon nitride structural element comprising the silicon nitride sintered body noted above.

According to a first aspect of the present invention, there is provided a silicon nitride sintered body exhibiting a high heat conductivity, the silicon nitride sintered body containing a rare earth element in an amount of 2 to 17.5 mass % in terms of the oxide thereof, Fe in an amount of 0.07 to 0.5 mass % in terms of the oxide thereof, Ca in an amount of 0.07 to 0.5 mass % in terms of the oxide thereof, Al in an amount of 0.1 to 0.6 mass % in terms of the oxide thereof, Mg in an amount of 0.3 to 4 mass % in terms of the oxide thereof, and Hf in an amount not larger than 5 mass % (including 0 mass %) in terms of the oxide thereof.

According to a second aspect of the present invention, there is provided a silicon nitride structural element comprising a silicon nitride sintered body exhibiting a high heat conductivity, the silicon nitride sintered body containing a rare earth element in an amount of 2 to 17.5 mass % in terms of the oxide thereof, Fe in an amount of 0.07 to 0.5 mass % in terms of the oxide thereof, Ca in an amount of 0.07 to 0.5 mass % in terms of the oxide thereof, Al in an amount of 0.1 to 0.6 mass % in terms of the oxide thereof, Mg in an amount of 0.3 to 4 mass % in terms of the oxide thereof, and Hf in an amount not larger than 5 mass % (including 0 mass %) in terms of the oxide thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
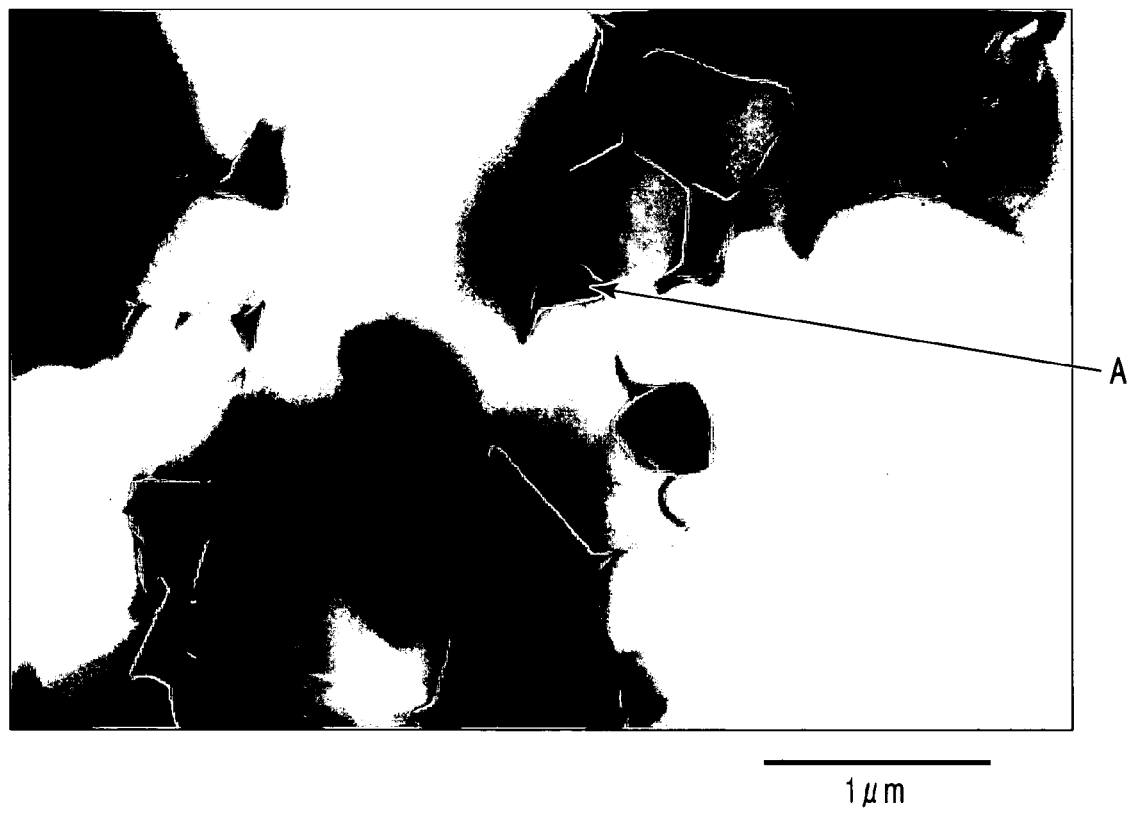
FIG. 1 is a transmission electron micrograph showing the fine texture of the silicon nitride sintered body of Example 1 of the present embodiment described herein later.

In order to cope with the requirement described above, the present inventors have conducted extensive research on the kinds of the silicon nitride powder used in the past, the kinds and addition amounts of the sintering agent and the additives used in the past, and the sintering conditions employed in the conventional method so as to confirm experimentally the influences given by these factors to the characteristics of the sintered body.

As a result, it has been found that it is possible to form a protective film exhibiting an oxidation resistance by controlling appropriately the amounts of Fe, Ca and Al contained in the silicon nitride sintered body so as to improve the oxidation resistance of the silicon nitride sintered body at temperatures falling within a range of 800° C. to 1,000° C. while maintaining a high heat conductivity, a high room temperature strength and a high density. To be more specific, it has been found that the protective film noted above can be formed if the Fe content of the silicon nitride sintered body is set to fall within a range of 0.07 to 0.5 mass % in terms of the oxide thereof, the Ca content of the silicon nitride sintered body is set to fall within a range of 0.07 to 0.5 mass % in terms of the oxide thereof, and the Al content is set to fall within a range of 0.1 to 0.6% in terms of the oxide thereof, under the conditions that the content of the rare earth element in the silicon nitride sintered body falls within a range of 2 to 17.5 mass % in terms of the oxide thereof, and that the content of Mg in the silicon nitride sintered body falls within a range of 0.3 to 4 mass % in terms of the oxide thereof. In the silicon nitride sintered body according to one embodiment of the present invention, it is possible to satisfy simultaneously the high heat conductivity not lower than 65 W/m·K, a room temperature strength in which the three point bending strength is not lower than 700 MPa under room temperature, the density that the porosity is not higher than 2 volume %, and the deterioration rate, which is not higher than 10%, of the room temperature strength after the heat treatment within a stationary air for 1,000 hours at temperatures of 800° C. to 1,000° C.

In the present embodiment, a rare earth element such as yttrium oxide is added as a sintering agent and, at the same time, Mg and Al are added in order to promote the function of the rare earth element as the sintering agent. In the silicon nitride sintered body containing a rare earth element, Mg and Al in amounts described above in terms of the oxides thereof, the rare earth element is coupled with a glass component so as to form a crystalline or amorphous grain boundary glass phase containing the rare earth element as the main component. Mg forms a solid solution within the grain boundary glass phase. On the other hand, Al is likely to form a solid solution within the silicon nitride crystal phase. Under the particular state, it is impossible to form a protective film. In addition, the aluminum forming a solid solution within the crystal phase tends to lower the heat conductivity.

If the silicon nitride sintered body is allowed to contain Fe and Ca in amounts described above in terms of the oxides thereof, it is possible to permit the three elements of Al, Fe and Ca to be present together within the grain boundary phase so as to make it possible to form a glass protective film having a large oxidation resistance on the surface of the sintered body under the oxidizing atmosphere of temperatures falling within a range of 800° C. to 1,000° C. It follows that it is possible to suppress the lowering of the mechanical strength of the silicon nitride sintered body under the oxidizing atmosphere without impairing the room temperature strength, heat conductivity and density of the silicon nitride sintered body.

The reasons for specifying the amounts of the additives of the silicon nitride sintered body will now be described in detail.

(Rare Earth Element)

A rare earth element such as yttrium oxide, which is added as a sintering agent, is capable of reaction with a silicon nitride powder so as to form a liquid phase and, thus, performs the function of the sintering accelerator. If the addition amount of the rare earth element is smaller than 2 mass % in terms of the oxide thereof, the sintered body fails to be densified sufficiently. On the other hand, if the addition amount of the rare earth element exceeds 17.5 mass % in terms of the oxide thereof, the heat conductivity, mechanical strength or oxidation resistance of the silicon nitride sintered body is lowered. It is more desirable for the rare earth element to be contained in the silicon nitride sintered body in an amount of 3 to 12.5 mass % in terms of the oxide thereof. Incidentally, the amount of the rare earth element means the amount of $R_2O_3$ (where R denotes a rare earth element) in specifying the amount of the rare earth element contained in the silicon nitride sintered body.

(Mg Element)

Mg accelerates the function of the sintering accelerator performed by the rare earth element and permits densifying the silicon nitride sintered body at low temperatures so as to perform the function of suppressing the grain growth, with the result that the bending strength of the sintered body can be increased. If the Mg addition amount is smaller than 0.3 mass %, it is impossible to obtain a sufficient effect produced by the Mg addition. On the other hand, if the Mg addition amount exceeds 4 mass %, the heat conductivity and oxidation resistance of the silicon nitride sintered body are lowered. It is more desirable for the Mg addition amount to fall within a range of 0.5 to 3 mass %. Incidentally, the amount of Mg means the amount of MgO in specifying the amount of the Mg contained in the silicon nitride sintered body.

(Al Element)

Al accelerates the function of the sintering accelerator performed by the rare earth element and permits densifying the silicon nitride sintered body at low temperatures so as to perform the function of suppressing the grain growth, with the result that the bending strength of the sintered body can be increased. If the amount of Al is smaller than 0.1 mass % in terms of the oxide thereof, the sintered body cannot be densified sufficiently. On the other hand, if the amount of Al exceeds 0.6 mass % in terms of the oxide thereof, the migration of Al into the crystal phase so as to a solid solution is promoted even if Fe and Ca are contained in appropriate amounts in the silicon nitride sintered body. As a result, the heat conductivity of the silicon nitride sintered body is lowered. It is more desirable for Al to be contained in the silicon nitride sintered body in an amount falling within a range of 0.1 to 0.4 mass % in terms of the oxide thereof. Incidentally, the amount of Al means the amount of $Al_2O_3$ in specifying the amount of the Al contained in the silicon nitride sintered body.

(Fe Element)

If the amount of Fe is smaller than 0.07 mass % in terms of the oxide thereof, a protective film cannot be formed sufficiently, even if Ca and Al are contained in the silicon nitride sintered body in appropriate amounts, with the result that the oxidation resistance of the silicon nitride sintered body is lowered at temperatures falling within a range of 800 to 1,000° C. On the other hand, if the amount of Fe exceeds 0.5 mass % in terms of the oxide thereof, the mechanical strength of the silicon nitride sintered body is lowered. It is more desirable for the amount of Fe contained in the silicon nitride sintered body to fall within a range of 0.07 to 0.45 mass %, more desirably to fall within a range of 0.1 to 0.35 mass %, in terms of the oxide thereof. Incidentally, the amount of Fe means the amount of $Fe_2O_3$ in specifying the amount of the Fe contained in the silicon nitride sintered body.

(Ca Element)

If the amount of Ca is smaller than 0.07 mass % in terms of the oxide thereof, a protective film cannot be formed sufficiently, even if Fe and Al are contained in the silicon nitride sintered body in appropriate amounts, with the result that the oxidation resistance of the silicon nitride sintered body is lowered at temperatures falling within a range of 800 to 1,000° C. On the other hand, if the amount of Ca exceeds 0.5 mass % in terms of the oxide thereof, the heat conductivity of the silicon nitride sintered body is lowered. It is more desirable for the amount of Ca contained in the silicon nitride sintered body to fall within a range of 0.07 to 0.45 mass %, more desirably to fall within a range of 0.1 to 0.3 mass % in terms of the oxide thereof. Incidentally, the amount of Ca means the amount of CaO in specifying the amount of the Ca contained in the silicon nitride sintered body.

It is possible for the silicon nitride sintered body of the present embodiment to contain Hf. Hf further accelerates the function of the sintering accelerator performed by the rare earth element and also performs the function of crystallizing the grain boundary phase, with the result that the heat conductivity of the silicon nitride sintered body can be improved. However, if the addition amount of Hf exceeds 5 mass % in terms of the oxide thereof, it is possible for the heat conductivity, mechanical strength or oxidation resistance of the silicon nitride sintered body to be lowered. Naturally, it is desirable for the addition amount of Hf not to exceed 5 mass % in terms of the oxide thereof. Also, in order to obtain sufficiently the effect produced by the Hf addition, it is desirable for the lower limit of the Hf addition amount to be set at 0.2 mass % in terms of the oxide thereof. It is more desirable for the Hf addition amount to fall within a range of 0.5 to 4 mass % in terms of the oxide thereof. Incidentally, the amount of Hf means the amount of $HfO_2$ in specifying the amount of the Hf contained in the silicon nitride sintered body.

The silicon nitride sintered body has a fine texture including a silicon nitride crystal phase and a grain boundary phase. It is desirable for the grain boundary phase to include at least 20% of the crystalline grain boundary phase. Particularly, it is desirable for the grain boundary phase to include at least 50% of the crystalline grain boundary phase. If the amount of the crystalline grain boundary phase is smaller than 20%, it is difficult to obtain a sintered body excellent in heat dissipating characteristics and in mechanical strength.

The silicon nitride sintered body of the present embodiment can be manufactured by, for example, a metal nitriding method. To be more specific, a raw material mixture is prepared first by adding prescribed amounts of a rare earth element, Mg and Hf to a cheap silicon nitride powder containing prescribed amounts of Fe, Al and Ca as impurities and containing at least 80 mass % of the α-phase type silicon nitride. The raw material mixture is molded and degreased, followed by heating the molded material at a prescribed temperature for a prescribed time so as to densify and sinter the molded material and subsequently cooling slowly the sintered molded material at a cooling rate not higher than a prescribed rate. For example, the raw material mixture is prepared by adding 2 to 17.5 mass % of a rare earth element in terms of the oxide thereof, 0.07 to 0.5 mass % of Fe in terms of the oxide thereof, 0.07 to 0.5 mass % of Ca in terms of the oxide thereof, 0.1 to 0.6 mass % of Al in terms of the oxide thereof, 0.3 to 4 mass % of Mg in terms of the oxide thereof, and not larger than 5 mass % of Hf in terms of the oxide thereof, to a silicon nitride powder manufactured by the metal nitriding method. The silicon nitride powder contains not larger than 2 mass % of oxygen and not larger than 0.3 mass % of each of Fe, Al and Ca as impurities, and has an average particle diameter not larger than 1.5 μm. The raw material mixture thus obtained is molded, and the molded material is degreased and, then, sintered at temperatures falling within a range of 1,700° C. to 1,900° C. Further, the sintered material is cooled from the sintering temperature to the temperature at which the liquid phase formed by the rare earth element, etc., during the sintering process is solidified. The cooling rate employed in the cooling step is not higher than 100° C./h.

Needless to say, the composition prepared by adding prescribed amounts of the rare earth element, Fe, Al, Ca, Mg, and Hf to a silicon nitride powder permits exhibiting the excellent characteristics described above in the present embodiment, even in the case of using a fine and high purity silicon nitride powder. For example, the silicon nitride sintered body of the present embodiment can be obtained by adding the various additives to a silicon nitride powder in a manner to obtain the composition described above in the case of using a silicon nitride powder manufactured by the imide decomposition method. The silicon nitride powder contains not larger than 1.5 mass % of oxygen and not larger than 0.001 mass % of each of Fe, Al and Ca as impurities, and has an average particle diameter not larger than 0.6 μm.

The silicon nitride structural element using the silicon nitride sintered body of the present embodiment described above includes, for example, a ceramic ball used in, for example, a bearing, a ceramic part for a vehicle such as a roller for a diesel pump, a master piston, and a plunger for a diesel pump, a tool used in a semiconductor device manufacturing apparatus such as a center valve or a contact collet or a mask, a tool for a brazing apparatus, a thermal tool used for manufacturing a Braun tube, a heater tube and a solder vessel.

EXAMPLES

Examples of the present invention will now be described with reference to the accompanying drawings.

Examples 1 to 20 and Comparative Examples 1 to 8

A raw material mixture was prepared by adding a $Y_2O_3$ (yttrium oxide) powder used as a sintering accelerator and having an average particle diameter of 0.7 μm, an $Al_2O_3$ (aluminum oxide) powder having an average particle diameter of 0.5 μm, an $Fe_2O_3$ (iron oxide) powder having an average particle diameter of 0.5 μm, a CaO (calcium oxide) powder having an average particle diameter of 0.5 μm, a MgO (magnesium oxide) powder having an average particle diameter of 0.5 μm, and a $HfO_2$ (hafnium oxide) powder having an average particle diameter of 0.6 μm to a $Si_3N_4$ (silicon nitride) raw material powder A manufactured by the metal nitriding method such that raw material mixture has compositions shown in Table 1, followed by applying a wet mixing to the raw material mixture for 100 hours by using silicon nitride balls within an ethyl alcohol. Then, a press molding was applied to the raw material mixture by applying a molding pressure of 100 MPa to the raw material mixture so as to obtain a large number of molded bodies each sized at 50×50×5 cm (thickness). The molded bodies thus obtained were degreased for 4 hours at 450° C. within an air stream, followed by applying a sintering treatment under the conditions shown in Table 1, thereby obtaining silicon nitride sintered bodies for Examples 1 to 20 and Comparative Examples 1 to 8. The $Si_3N_4$ raw material powder A contained 90% of α-phase type silicon nitride, 1.7 mass % of oxygen, and impurities including 0.2 mass % of Fe, 0.1 mass % of Al, 0.2 mass % of Ca, and 0.01 mass % of Mg. The $Si_3N_4$ raw material powder A had an average particle diameter of 1.1 μm.

Examples 21 to 24 and Comparative Examples 9 to 12

Silicon nitride sintered bodies as Examples 21 to 24 and Comparative Examples 9 to 12 were manufactured under the conditions shown in Table 2 by using $Si_3N_4$ powder B manufactured by the metal nitriding method. The $Si_3N_4$ powder B contained 93% of α-phase type silicon nitride, 1.5 mass % of oxygen and also contained impurities including 0.03 mass % of Fe, 0.07 mass % of Al, 0.02 mass % of Ca, and not larger than 0.01 mass % of Mg. The $Si_3N_4$ powder B had an average particle diameter of 0.7 μm.

Examples 25 to 28 and Comparative Examples 13 to 16

Silicon nitride sintered bodies as Examples 25 to 28 and Comparative Examples 13 to 16 were manufactured under the conditions shown in Table 2 by using a fine and high purity $Si_3N_4$ powder C manufactured by the imide decomposition method. The $Si_3N_4$ powder C contained 97% of α-phase type silicon nitride and 1.2 mass % of oxygen, and also contained impurities including 0.001 mass % of Fe, 0.0005 mass % of Al, 0.0005 mass % of Ca, and not larger than 0.0005 mass % of Mg. The $Si_3N_4$ powder C had an average particle diameter of 0.5 μm.

The porosity, heat conductivity (20° C.), three point bending strength at 20° C., and volume ratio of the crystalline grain boundary phase relative to all the grain boundary phase were measured for the silicon nitride sintered body obtained in each of Examples 1 to 28 and Comparative Examples 1 to 16. The volume ratio of the crystalline grain boundary phase relative to all the grain boundary phase was measured by the X-ray diffraction. Also measured was the reduction rate of the three point bending strength at room temperature after the oxidizing treatment at 800° C. and 1,000° C. for 1,000 hours within stationary air. The reduction rate noted above was measured on the basis of the three point bending strength at room temperature before the oxidizing treatment. The results are shown in Tables 1 and 2.

Incidentally, the porosity was obtained by measuring the density by the Archimedes' method so as to calculate the relative density (percentage) relative to the theoretical density. The porosity is represented by the difference in value between the theoretical density and the relative density, said difference being expressed by percentage. Also, the three point bending strength was measured as follows. Specifically, a bending test piece was cut out of the sintered body, and a grinding process was applied to the test piece on the basis of the bending strength test method of a ceramic material specified in JIS R 1601 so as to finish the surface roughness in the longitudinal direction of the test piece at 0.8 S. The three point bending strength was measured by using the surface having the surface roughness of 0.8 S as the pulling side.

TABLE 1

| Sample | | Kind of silicon nitride raw material powder | Raw material composition (including impurities) (mass %) | | | | | | | Sintering conditions temperature × time × pressure (° C.) × (hr) × (MPa) |
|---|---|---|---|---|---|---|---|---|---|---|
| | | | $Si_3N_4$ | Rare earth element oxide | | $Fe_2O_3$ | $Al_2O_3$ | CaO | MgO | $HfO_2$ | |
| Examples | 1 | A | 90.3 | $Y_2O_3$ | 5 | 0.3 | 0.2 | 0.2 | 2 | 2 | 1775 × 8 × 0.7 |
| | 2 | A | 90.3 | $Y_2O_3$ | 5 | 0.3 | 0.2 | 0.2 | 2 | 2 | 1850 × 8 × 0.7 |
| | 3 | A | 91.3 | $Y_2O_3$ | 5 | 0.3 | 0.2 | 0.2 | 1 | 2 | 1800 × 8 × 0.7 |
| | 4 | A | 91.3 | $Y_2O_3$ | 5 | 0.3 | 0.2 | 0.2 | 1 | 2 | 1900 × 8 × 0.7 |
| | 5 | A | 89.8 | $Y_2O_3$ | 5 | 0.3 | 0.2 | 0.2 | 1 | 2 | 1900 × 8 × 0.7 |
| | 6 | A | 89.3 | $Y_2O_3$ | 5 | 0.3 | 0.2 | 0.2 | 4 | 2 | 1800 × 8 × 0.7 |

TABLE 1-continued

| Sample | Kind of silicon nitride raw material powder | Si$_3$N$_4$ | Rare earth element oxide | % | Fe$_2$O$_3$ | Al$_2$O$_3$ | CaO | MgO | HfO$_2$ | Sintering conditions temperature × time × pressure (°C.) × (hr) × (MPa) |
|---|---|---|---|---|---|---|---|---|---|---|
| 7 | A | 91.3 | Y$_2$O$_3$ | 5 | 0.3 | 0.2 | 0.2 | 2 | 1 | 1800 × 8 × 0.7 |
| 8 | A | 89.8 | Y$_2$O$_3$ | 5 | 0.3 | 0.2 | 0.2 | 2 | 0.5 | 1850 × 8 × 0.7 |
| 9 | A | 89 | Y$_2$O$_3$ | 5 | 0.3 | 0.2 | 0.2 | 0.3 | 5 | 1900 × 8 × 0.7 |
| 10 | A | 86.3 | Y$_2$O$_3$ / Er$_2$O$_3$ | 3.5 / 6.5 | 0.3 | 0.2 | 0.2 | 1 | 2 | 1800 × 8 × 0.7 |
| 11 | A | 86.3 | Y$_2$O$_3$ / Er$_2$O$_3$ | 3.5 / 6.5 | 0.3 | 0.2 | 0.2 | 1 | 2 | 1900 × 8 × 0.7 |
| 12 | A | 85.3 | Y$_2$O$_3$ / Er$_2$O$_3$ | 3.5 / 6.5 | 0.3 | 0.2 | 0.2 | 2 | 2 | 1750 × 8 × 0.7 |
| 13 | A | 85.3 | Y$_2$O$_3$ / Er$_2$O$_3$ | 3.5 / 6.5 | 0.3 | 0.2 | 0.2 | 2 | 2 | 1850 × 8 × 0.7 |
| 14 | A | 90 | Y$_2$O$_3$ | 2 | 0.3 | 0.4 | 0.3 | 3 | 2 | 1850 × 8 × 0.7 |
| 15 | A | 77.8 | Yb$_2$O$_3$ | 17.5 | 0.3 | 0.2 | 0.2 | 2 | 2 | 1850 × 8 × 0.7 |
| 16 | A | 90.1 | Y$_2$O$_3$ | 5 | 0.5 | 0.2 | 0.2 | 2 | 2 | 1800 × 8 × 0.7 |
| 17 | A | 90.8 | Y$_2$O$_3$ | 5 | 0.3 | 0.5 | 0.2 | 1 | 2 | 1800 × 8 × 0.7 |
| 18 | A | 90 | Y$_2$O$_3$ | 5 | 0.3 | 0.3 | 0.5 | 2 | 2 | 1800 × 8 × 0.7 |
| 19 | A | 90.3 | Y$_2$O$_3$ | 5 | 0.3 | 0.2 | 0.2 | 2 | 2 | 1850 × 8 × 0.7 |
| 20 | A | 90.8 | Y$_2$O$_3$ | 5 | 0.3 | 0.5 | 0.2 | 1 | 2 | 1800 × 8 × 0.7 |
| Comparative Examples 1 | A | 94.3 | Y$_2$O$_3$ | 1 | 0.3 | 0.2 | 0.2 | 2 | 2 | 1900 × 8 × 0.7 |
| 2 | A | 75.3 | Yb$_2$O$_3$ | 20 | 0.3 | 0.2 | 0.2 | 2 | 2 | 1850 × 8 × 0.7 |
| 3 | A | 90 | Y$_2$O$_3$ | 5 | 0.6 | 0.2 | 0.2 | 2 | 2 | 1850 × 8 × 0.7 |
| 4 | A | 89.8 | Y$_2$O$_3$ | 5 | 0.3 | 0.7 | 0.2 | 2 | 2 | 1850 × 8 × 0.7 |
| 5 | A | 89.9 | Y$_2$O$_3$ | 5 | 0.3 | 0.2 | 0.6 | 2 | 2 | 1850 × 8 × 0.7 |
| 6 | A | 87.3 | Y$_2$O$_3$ | 5 | 0.3 | 0.2 | 0.2 | 5 | 2 | 1800 × 8 × 0.7 |
| 7 | A | 86.3 | Y$_2$O$_3$ | 5 | 0.3 | 0.2 | 0.2 | 2 | 6 | 1800 × 8 × 0.7 |
| 8 | A | 89.8 | Y$_2$O$_3$ | 5 | 0.3 | 0.5 | 0.2 | 2 | 2 | 1800 × 8 × 0.7 |

| Sample | Cooling rate of the sintered material to 1500° C. (° C./hr) | Porosity (%) | Ratio (%) of crystalline phase to grain boundary phase | Heat conductivity (W/m · k) | Three-point bending strength (MPa) | Reduction rate (%) of three-point bending strength after oxidizing treatment for 1,000 hours 800° C. | 1000° C. |
|---|---|---|---|---|---|---|---|
| Examples 1 | 100 | 0.3 | 40 | 73 | 900 | 0 | 2 |
| 2 | 100 | <0.1 | 40 | 78 | 785 | 0 | 1 |
| 3 | 100 | 0.4 | 40 | 73 | 800 | 0 | 0 |
| 4 | 100 | <0.1 | 50 | 82 | 730 | 0 | 0 |
| 5 | 100 | 1.9 | 60 | 88 | 705 | 0 | 0 |
| 6 | 100 | <0.1 | 23 | 66 | 920 | 0 | 6 |
| 7 | 100 | <0.1 | 36 | 73 | 765 | 0 | 0 |
| 8 | 100 | <0.1 | 30 | 75 | 800 | 0 | 2 |
| 9 | 100 | 1.5 | 55 | 87 | 710 | 0 | 6 |
| 10 | 100 | 0.3 | 45 | 76 | 800 | 0 | 3 |
| 11 | 100 | <0.1 | 50 | 88 | 735 | 0 | 3 |
| 12 | 100 | <0.1 | 40 | 72 | 950 | 0 | 2 |
| 13 | 100 | <0.1 | 42 | 81 | 800 | 0 | 3 |
| Examples 14 | 100 | 0.9 | 20 | 67 | 750 | 0 | 2 |
| 15 | 100 | 1.0 | 50 | 78 | 710 | 0 | 5 |
| 16 | 100 | <0.1 | 30 | 70 | 850 | 0 | 2 |
| 17 | 100 | <0.1 | 20 | 67 | 915 | 0 | 0 |
| 18 | 100 | 0.2 | 25 | 68 | 800 | 0 | 5 |
| 19 | 50 | <0.1 | 55 | 85 | 800 | 0 | 0 |
| 20 | 50 | <0.1 | 25 | 70 | 920 | 0 | 0 |
| Comparative Examples 1 | 100 | 2.5 | 30 | 65 | 650 | 0 | 0 |
| 2 | 100 | 1.8 | 45 | 70 | 660 | 5 | 10 |
| 3 | 100 | <0.1 | 23 | 69 | 670 | 0 | 2 |
| 4 | 100 | <0.1 | 15 | 60 | 945 | 0 | 0 |
| 5 | 100 | <0.1 | 20 | 64 | 780 | 0 | 3 |
| 6 | 100 | <0.1 | 17 | 60 | 800 | 0 | 10 |
| 7 | 100 | <0.1 | 40 | 79 | 690 | 0 | 10 |
| 8 | 500 | <0.1 | 14 | 60 | 930 | 0 | 2 |

TABLE 2

| Sample | Kind of silicon nitride raw material powder | Si$_3$N$_4$ | Rare earth element oxide | % | Fe$_2$O$_3$ | Al$_2$O$_3$ | CaO | MgO | HfO$_2$ | Sintering conditions temperature × time × pressure (°C.) × (hr) × (MPa) |
|---|---|---|---|---|---|---|---|---|---|---|
| Examples 21 | B | 90.3 | Y$_2$O$_3$ | 5 | 0.3 | 0.2 | 0.2 | 2 | 2 | 1775 × 8 × 0.7 |
| 22 | B | 90.2 | Y$_2$O$_3$ | 5 | 0.1 | 0.5 | 0.2 | 2 | 2 | 1775 × 8 × 0.7 |
| 23 | B | 91.8 | Y$_2$O$_3$ | 5 | 0.3 | 0.2 | 0.2 | 0.5 | 2 | 1850 × 8 × 0.7 |
| 24 | B | 91.8 | Y$_2$O$_3$ | 5 | 0.3 | 0.2 | 0.2 | 2 | 0.5 | 1850 × 8 × 0.7 |

TABLE 2-continued

| | | | | | | | | | | | |
|---|---|---|---|---|---|---|---|---|---|---|---|
| Comparative | 9 | B | 94.8 | Y$_2$O$_3$ | 5 | 0.04 | 0.14 | 0.02 | <0.02 | 0 | 1900 × 8 × 0.7 |
| Examples | 10 | B | 92.8 | Y$_2$O$_3$ | 5 | 0.04 | 0.14 | 0.02 | <0.02 | 2 | 1900 × 8 × 0.7 |
| | 11 | B | 90.8 | Y$_2$O$_3$ | 5 | 0.04 | 0.14 | 0.02 | 2 | 2 | 1800 × 8 × 0.7 |
| | 12 | B | 91.4 | Y$_2$O$_3$ | 5 | 0.04 | 0.5 | 0.02 | 1 | 2 | 1850 × 8 × 0.7 |
| Examples | 25 | C | 90.3 | Y$_2$O$_3$ | 5 | 0.3 | 0.2 | 0.2 | 2 | 2 | 1775 × 8 × 0.7 |
| | 26 | C | 90.8 | Y$_2$O$_3$ | 5 | 0.07 | 0.1 | 0.07 | 2 | 2 | 1775 × 8 × 0.7 |
| | 27 | C | 90.7 | Y$_2$O$_3$ | 5 | 0.07 | 0.2 | 0.07 | 2 | 2 | 1775 × 8 × 0.7 |
| | 28 | C | 91.8 | Y$_2$O$_3$ | 5 | 0.3 | 0.5 | 0.07 | 0.3 | 2 | 1850 × 8 × 0.7 |
| Comparative | 13 | C | 95 | Y$_2$O$_3$ | 5 | <0.001 | <0.0005 | <0.0005 | <0.0005 | 0 | 1900 × 8 × 0.7 |
| Examples | 14 | C | 93 | Y$_2$O$_3$ | 5 | <0.001 | <0.0005 | <0.0005 | <0.0005 | 2 | 1900 × 8 × 0.7 |
| | 15 | C | 92 | Y$_2$O$_3$ | 5 | <0.001 | <0.0005 | <0.0005 | 1 | 2 | 1850 × 8 × 0.7 |
| | 16 | C | 91.5 | Y$_2$O$_3$ | 5 | <0.001 | 0.5 | <0.01 | 1 | 2 | 1850 × 8 × 0.7 |

| | Sample | Cooling rate of the sintered material to 1500° C. (° C./hr) | Porosity (%) | Ratio (%) of crystalline phase to grain boundary phase | Heat conductivity (W/m·k) | Three-point bending strength (MPa) | Reduction rate (%) of three-point bending strength after oxidizing treatment for 1,000 hours 800° C. | 1000° C. |
|---|---|---|---|---|---|---|---|---|
| Examples | 21 | 100 | <0.1 | 40 | 74 | 920 | 0 | 0 |
| | 22 | 100 | <0.1 | 30 | 68 | 945 | 0 | 2 |
| | 23 | 100 | 1.1 | 45 | 80 | 800 | 0 | 0 |
| | 24 | 100 | 0.4 | 26 | 67 | 840 | 0 | 0 |
| Comparative | 9 | 100 | 1.9 | 38 | 82 | 700 | 12 | 14 |
| Examples | 10 | 100 | 1.9 | 44 | 82 | 700 | 10 | 17 |
| | 11 | 100 | 0.2 | 40 | 80 | 900 | 10 | 16 |
| | 12 | 100 | 0.1 | 30 | 70 | 920 | 11 | 13 |
| Examples | 25 | 100 | <0.1 | 38 | 76 | 950 | 0 | 0 |
| | 26 | 100 | <0.1 | 45 | 80 | 900 | 4 | 7 |
| | 27 | 100 | <0.1 | 40 | 78 | 900 | 3 | 5 |
| | 28 | 100 | 0.3 | 30 | 70 | 935 | 0 | 0 |
| Comparative | 13 | 100 | 0.8 | 50 | 82 | 890 | 15 | 20 |
| Examples | 14 | 100 | <0.1 | 70 | 90 | 805 | 13 | 24 |
| | 15 | 100 | <0.1 | 50 | 85 | 900 | 12 | 16 |
| | 16 | 100 | <0.1 | 28 | 74 | 945 | 11 | 14 |

The silicon nitride sintered body of each of Examples 1 to 20 contains a rare earth element in an amount of 2 to 17.5 mass % in terms of the oxide thereof, Fe in an amount of 0.07 to 0.5 mass % in terms of the oxide thereof, Ca in an amount of 0.07 to 0.5 mass % in terms of the oxide thereof, Al in an amount of 0.1 to 0.6 mass % in terms of the oxide thereof, Mg in an amount of 0.3 to 4 mass % in terms of the oxide thereof, and Hf in an amount not larger than 5 mass % in terms of the oxide thereof. As in apparent from Table 1, the silicon nitride sintered body for each of these Examples exhibited not lower than 65 W/m·K of a heat conductivity, not lower than 700 MPa of the three point bending strength at room temperature, not higher than 2% by volume of the porosity, and not higher than 10% of the deterioration rate of the room temperature strength after the oxidizing treatment for 1,000 hours at 800° C. and 1,000° C. within stationary air.

Particularly, attentions should be paid to the silicon nitride sintered body for each of Examples 1 to 5, 7, 8, 10 to 13 and 19, which contained a rare earth element in an amount of 3 to 12.5 mass % in terms of the oxide thereof, Fe in an amount of 0.1 to 0.35 mass % in terms of the oxide thereof, Ca in an amount of 0.1 to 0.3 mass % in terms of the oxide thereof, Al in an amount of 0.1 to 0.4 mass % in terms of the oxide thereof, Mg in an amount of 0.5 to 3 mass % in terms of the oxide thereof, and Hf in an amount of 0.5 to 4 mass % in terms of the oxide thereof. As in apparent from Table 1, the silicon nitride sintered body for each of these Examples was found to exhibit sufficient properties in any of the heat conductivity, room temperature strength and oxidation resistance.

On the other hand, in Comparative Example 1, the amount of the rare earth element contained in the silicon nitride sintered body was smaller than 2 mass % in terms of the oxide thereof. In Comparative Example 2, the amount of the rare earth element contained in the silicon nitride sintered body exceeded 17.5 mass % in terms of the oxide thereof. In Comparative Example 3, the amount of iron contained in the silicon nitride sintered body exceeded 0.5 mass % in terms of the oxide thereof. Further, in Comparative Example 7, the amount of Hf contained in the silicon nitride sintered body exceeded 5 mass % in terms of the oxide thereof. In each of these Comparative Examples, the three point bending strength of the silicon nitride sintered body at room temperature did not reach 700 MPa. Also, in the silicon nitride sintered body for Comparative Example 1, the porosity exceeded 2% by volume.

In Comparative Example 4, the amount of Al contained in the silicon nitride sintered body exceeded 0.6 mass % in terms of the oxide thereof. In Comparative Example 5, the amount of Ca contained in the silicon nitride sintered body exceeded 0.5 mass % in terms of the oxide thereof. In Comparative Example 6, the amount of Mg contained in the silicon nitride sintered body exceeded 5 mass % in terms of the oxide thereof. Further, in Comparative Example 8, the cooling rate after the sintering process was set at 500° C./h. In each of these Comparative Examples, the heat conductivity of the sintered body was found to be lower than 65 W/m·K.

On the other hand, the experimental data for Examples 21 to 28 are given in Table 2. The experimental data support that it is possible to obtain a satisfactory silicon nitride sintered body in the case of using silicon nitride raw material powders B and C having a higher purity. As in apparent from Table 2, it is possible to obtain silicon nitride sintered bodies having excellent characteristics, i.e., not lower than 65

W/m·K of the heat conductivity, not lower than 700 MPa of the three point bending strength at room temperature, not higher than 2% of the porosity, and not higher than 10% of the deterioration rate of the room temperature strength after the oxidizing treatment for 1,0000 hours in stationary air of 800 to 1,000° C.

The experimental data for Comparative Examples 9 to 12 and 16 indicate that the silicon nitride sintered body is poor in oxidation resistance at temperatures falling within a range of 800° C. to 1,000° C. such that the deterioration rate of the silicon nitride sintered body at 800° C. or at 1,000° C. exceeds 10% if each of the Fe content and the Ca content of the silicon nitride sintered body is lower than 0.07 mass % in terms of the oxides thereof, even if the Al content of the silicon nitride sintered body falls within a range of 0.1 to 0.6 mass %. Further, the experimental data for Comparative Examples 13 to 15 indicate that the oxidation resistance of the silicon nitride sintered body further deteriorates such that each of the deterioration rate at 800° C. and at 1,000° C. exceeds 10%, if the content of each of Al, Fe and Ca is very low.

Figure 2:
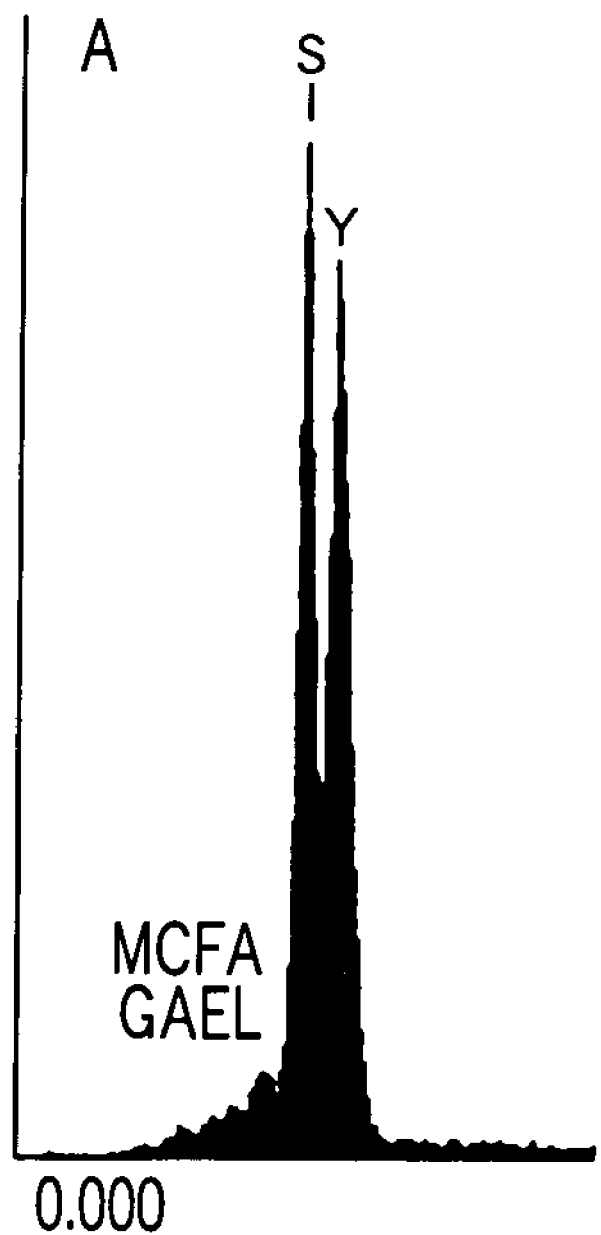
FIG. 2 is a graph showing the result of the element analysis of the crystal grain boundary phase at region A shown in FIG. 1.
Figure 3:
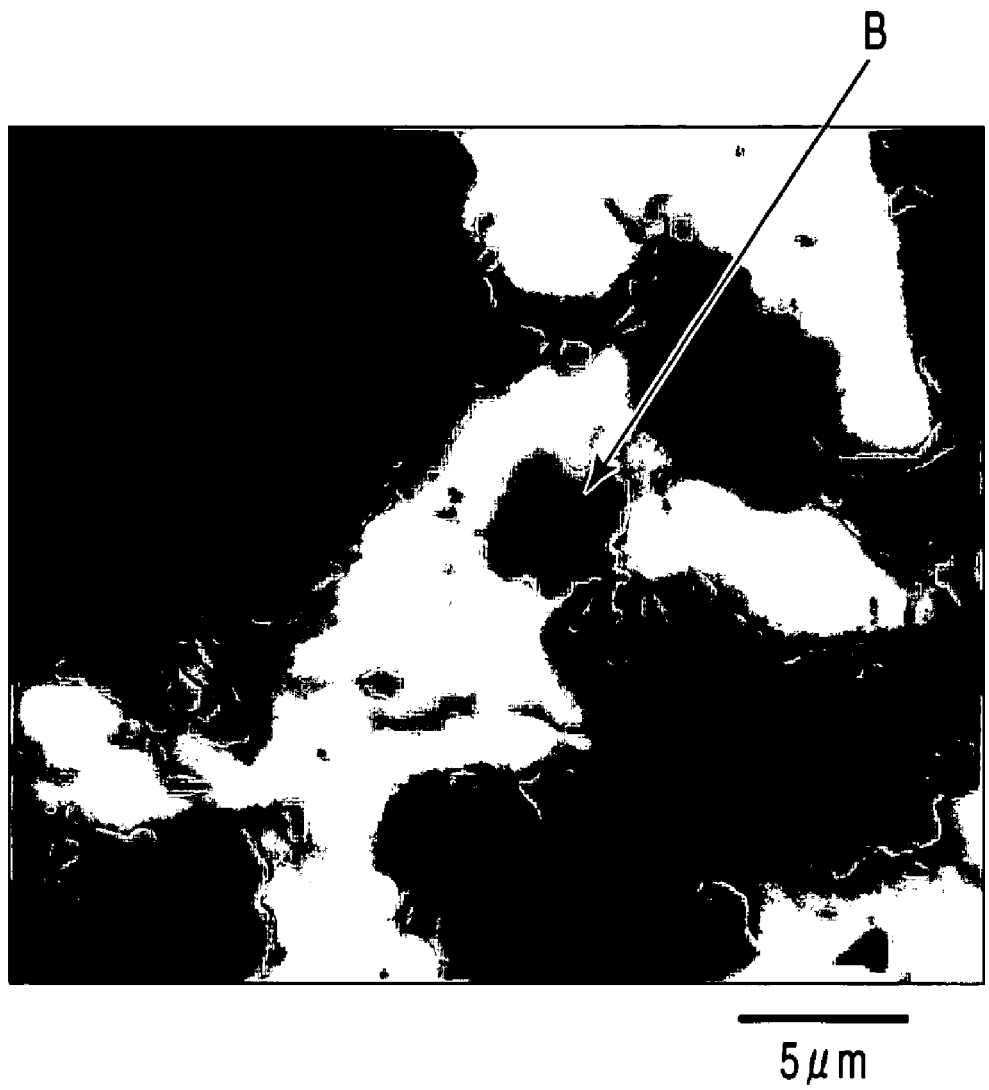
FIG. 3 is a transmission electron micrograph showing the fine texture in another view field of the silicon nitride sintered body of Example 1 of the present embodiment.
Figure 4:
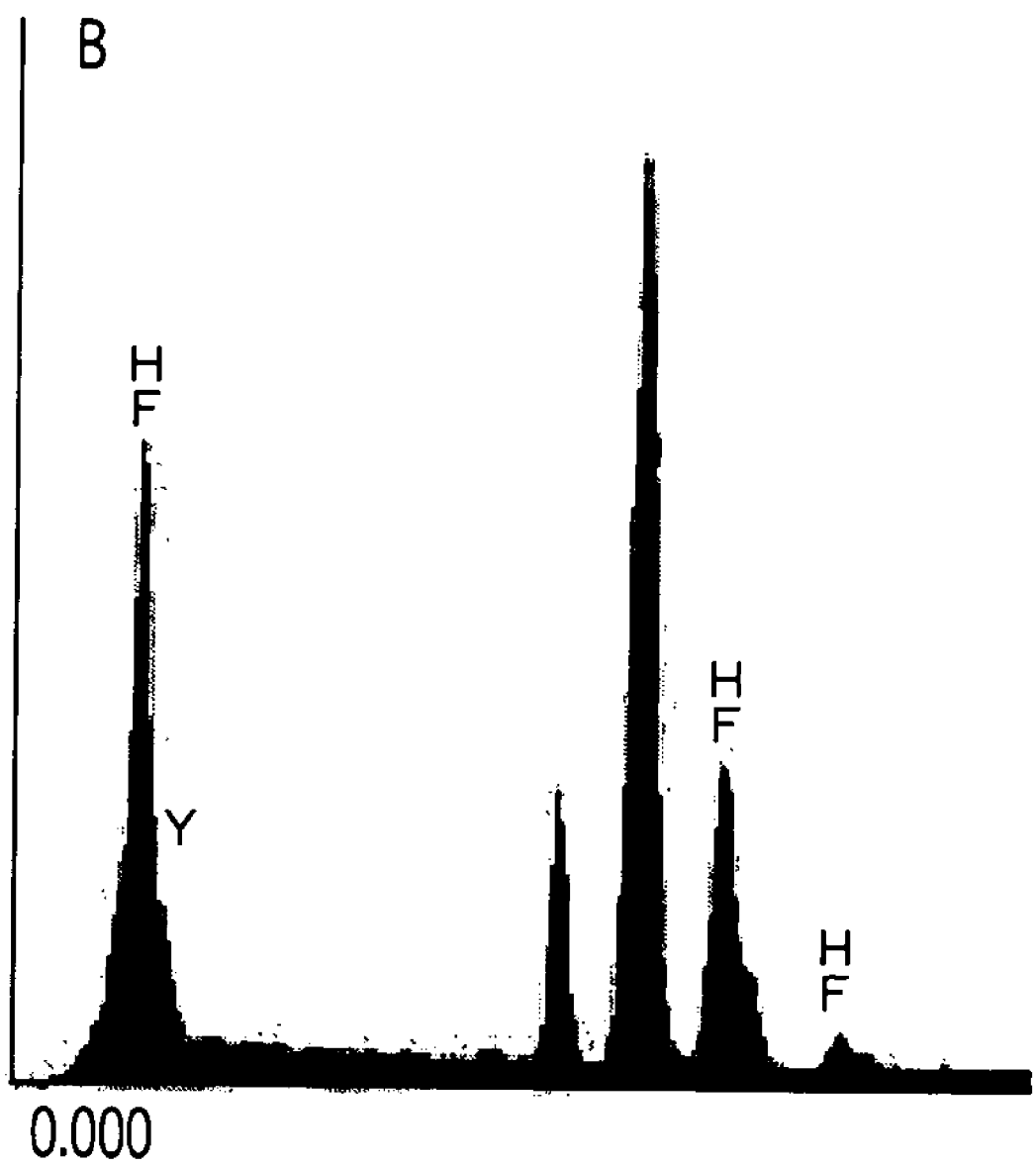
FIG. 4 is a graph showing the result of the element analysis of the crystal grain boundary phase at region B shown in FIG. 3.

The silicon nitride sintered body for Example 1 was observed with a transmission electron microscope (TEM). FIGS. 1 and 3 are micrographs showing the fine texture of the sintered body. As shown in FIGS. 1 and 3, it is possible to confirm the presence of the silicon nitride crystal phase and the crystal grain boundary phase by the TEM observation. It was confirmed by the element analysis shown in FIG. 2 that the crystal grain boundary phase in region A shown in FIG. 1 was a boundary glass phase formed of Y—Si—Al—Fe—Ca—Mg—O or Y—Si—Al—Fe—Ca—Mg—O—N. On the other hand, it was confirmed by the element analysis shown in FIG. 4 that the grain boundary phase in region B shown in FIG. 3 was formed of Y—Hf—O and $HfO_2$.

Figure 5:
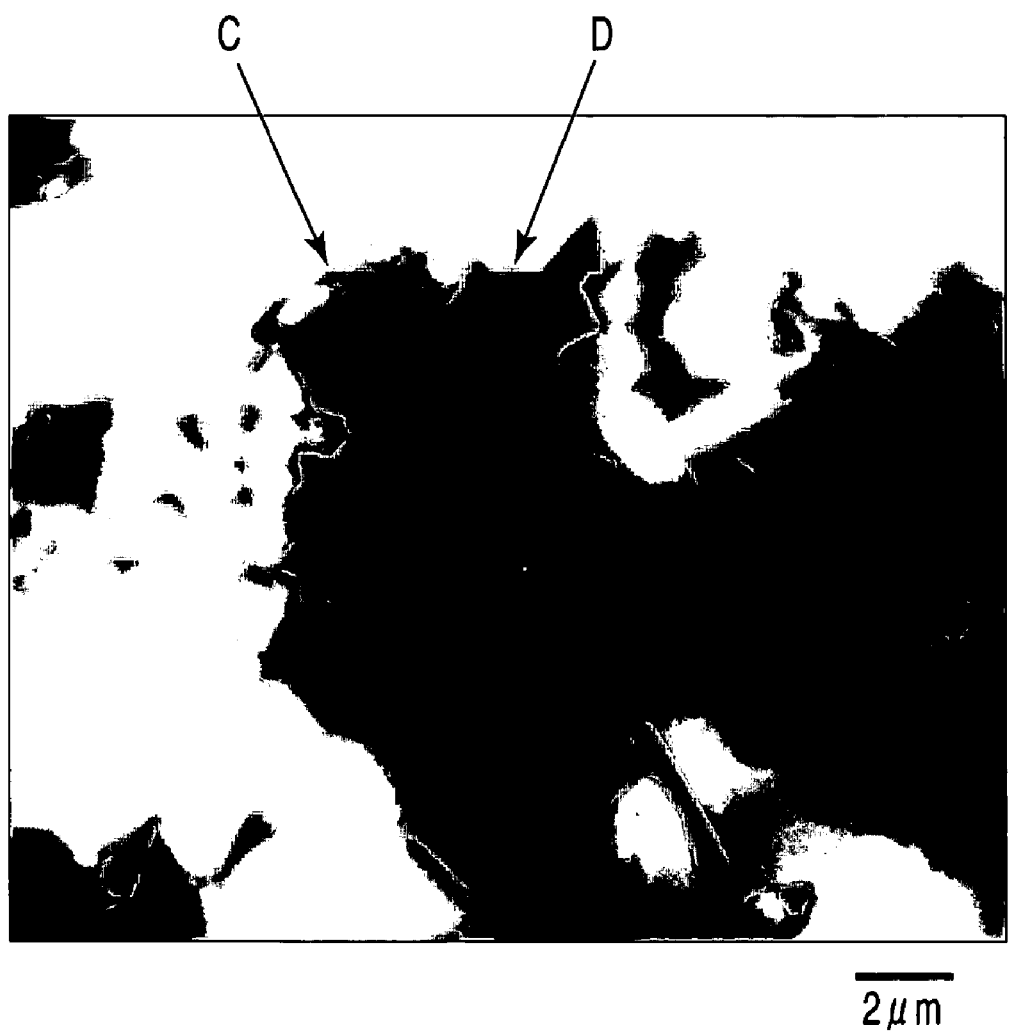
FIG. 5 is a transmission electron micrograph showing the fine texture of the silicon nitride sintered body of Comparative Example 14 described herein later.
Figure 6:
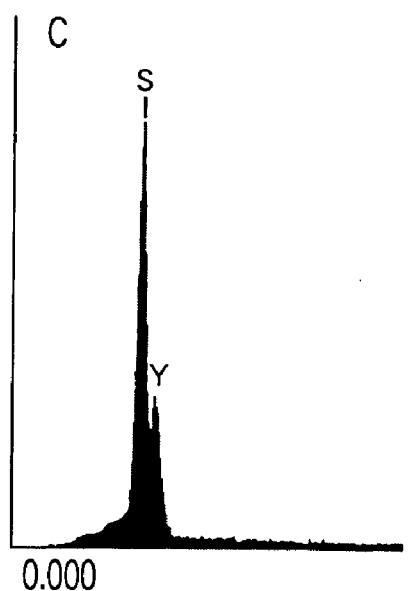
FIG. 6 is a graph showing the result of the element analysis of the crystal grain boundary phase at region C shown in FIG. 5.
Figure 7:
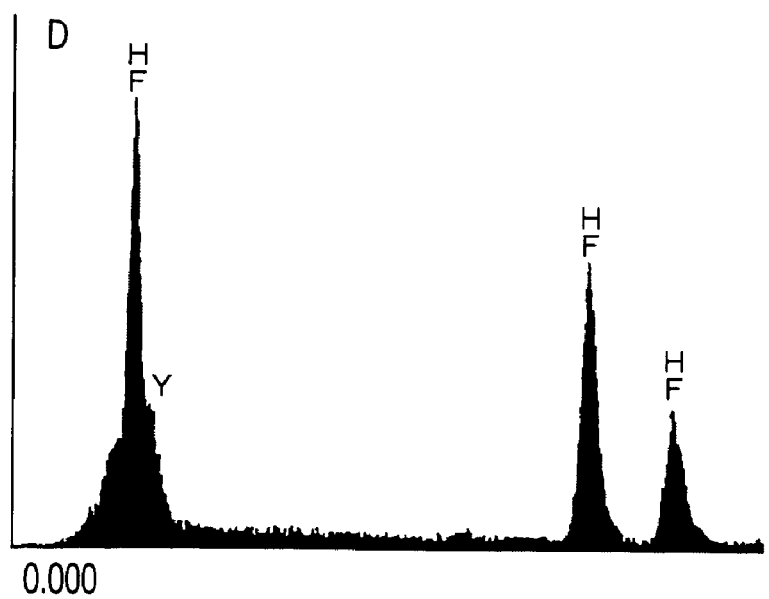
FIG. 7 is a graph showing the result of the element analysis of the crystal grain boundary phase at region D shown in FIG. 5.

A similar observation with a transmission electron microscope (TEM) was applied to the sintered body for Comparative Example 14 so as to confirm the presence of a silicon nitride crystal phase and a crystal grain boundary phase. FIG. 5 is a micrograph showing the fine texture of the silicon nitride sintered body for Comparative Example 14. It has been clarified by the element analysis shown in FIG. 6 that the crystal grain boundary phase in region C shown in FIG. 5 was a grain boundary glass phase formed of Y—Si—O or Y—Si—O—N. On the other hand, it has been clarified by the element analysis shown in FIG. 7 that the crystal grain boundary phase in region D shown in FIG. 5 was a grain boundary phase formed of Y—Hf—O and $HfO_2$.

By the observation with the electron microscope described above, it was possible to confirm the presence of the crystal grain boundary phase formed of Y—Hf—O and $HfO_2$ in the silicon nitride sintered body for each of Example 1 and Comparative Example 14. However, the presence of a grain boundary glass phase in which Al, Fe, Ca and Mg formed a solid solution was not recognized in the sintered body for Comparative Example 14. It has been clarified by the experimental data pointed out above that the grain boundary glass phase contributes to the improvement of the oxidation resistance of the silicon nitride sintered body.

The presence of compound X, i.e., a rare earth element—Si—Al—Fe—Ca—Mg—O compound, and compound Y, i.e., a rare earth element—-Si—Al—Fe—Ca—Mg—O—N compound, was examined by the TEM analysis in respect of the silicon nitride sintered body for each of Examples 2 to 28 and Comparative Examples 1–13, 15 and 16. Table 3 shows the results. The term "present" in Table 3 indicates that at least one of compound X and compound Y was included in the silicon nitride sintered body, and the term "none" indicates that none of compound X and compound Y was included in the silicon nitride sintered body. Table 3 also shows X (compound X) and/or Y (compound Y), i.e., the kind of the formed compound, in the case where at least one of compound X and compound Y was included in the silicon nitride sintered body. Incidentally, Table 3 also shows the data for Example 1 and Comparative Example 14 referred to above.

TABLE 3

| | Presence of compound | Kind of compound |
|---|---|---|
| Example 1 | Present | X |
| Example 2 | Present | X |
| Example 3 | Present | X |
| Example 4 | Present | X |
| Example 5 | Present | X |
| Example 6 | Present | X |
| Example 7 | Present | X |
| Example 8 | Present | X |
| Example 9 | Present | X, Y |
| Example 10 | Present | X |
| Example 11 | Present | X |
| Example 12 | Present | X |
| Example 13 | Present | X |
| Example 14 | Present | X |
| Example 15 | Present | X |
| Example 16 | Present | X |
| Example 17 | Present | X |
| Example 18 | Present | X |
| Example 19 | Present | X |
| Example 20 | Present | X |
| Example 21 | Present | X |
| Example 22 | Present | X |
| Example 23 | Present | X, Y |
| Example 24 | Present | X |
| Example 25 | Present | X |
| Example 26 | Present | X, Y |
| Example 27 | Present | X, Y |
| Example 28 | Present | X, Y |
| Comparative Example 1 | Present | X |
| Comparative Example 2 | Present | X |
| Comparative Example 3 | Present | X |
| Comparative Example 4 | Present | X |
| Comparative Example 5 | Present | X |
| Comparative Example 6 | Present | X |
| Comparative Example 7 | Present | X |
| Comparative Example 8 | Present | X |
| Comparative Example 9 | None | — |
| Comparative Example 10 | None | — |
| Comparative Example 11 | None | — |
| Comparative Example 12 | None | — |
| Comparative Example 13 | None | — |
| Comparative Example 14 | None | — |
| Comparative Example 15 | None | — |
| Comparative Example 16 | None | — |

As in apparent from Table 3, at least one of compound X and compound Y was contained in the silicon nitride sintered body for each of Examples 1 to 28. Also, each of compound X and compound Y was included in the crystal grain boundary phase. Each of compound X and compound Y was in the form of a solid solution and, thus, distinctive from a composite oxide. Compound X and compound Y include, for example, a solid solution comprising an Fe oxide and another element dissolved in the Fe oxide. Also, the element not forming a solid solution together with Fe was present separately from compound X and compound Y. It has been confirmed that a crystal grain boundary phase containing a rare earth element—Hf—O and $HfO_2$ was included in the silicon nitride sintered body for Examples 1 to 28 in addition to the crystal grain boundary phase containing compound X or compound Y.

On the other hand, Comparative Examples 9, 10, 13 and 14 covered the cases where the total amount of the cationic elements of Fe, Al, Ca and Mg was not larger than 0.3% by weight as in the three patent documents quoted previously, i.e., Japanese Patent Disclosure No. 7-48174, Japanese Patent Disclosure No. 6-135771 and Japanese Patent Disclosure No. 2000-34172. None of compound X and compound Y was present in the silicon nitride sintered body for the Comparative Examples quoted above. Also, none of compound X and compound Y was present in the silicon nitride sintered body for each of Comparative Examples 11, 12, 15 and 16, in which each of Fe and Ca was contained in an amount smaller than 0.07 mass % in terms of the oxides thereof.

A heater tube for an aluminum melt was manufactured as an example of a structural element by using the silicon nitride sintered body for each of Examples 1 to 28 and Comparative Examples 1 to 16. The heater tube was used in air of a temperature falling within a range of 800 to 1,000° C. It has been confirmed that the structural element formed of the silicon nitride sintered body for Examples 1 to 28 deteriorated less by oxidation so as to improve the durability by about 20%, compared with the structural element formed of the silicon nitride sintered body for Comparative Examples 1 to 16.

Incidentally, in the Examples described above, Y, Er and Yb were used as the rare earth elements. However, the rare earth elements used in the present embodiment are not limited to Y, Er and Yb. In the present embodiment, it is also possible to use, for example, Ce, Nd, Ho, and Dy as the rare earth elements. Also, it is possible to use a single kind of the rare earth element. Also, a plurality of different kinds of rare earth elements can be used together.

The present invention is not limited to the embodiments described above. It is possible to modify the constituting factors of the present invention within the technical scope of the present invention in actually working the invention. It is also possible to achieve various inventions by combining appropriately a plurality of constituting factors disclosed in the embodiments described above. For example, it is possible to delete some constituting factors from all the constituting factors described in the embodiments described above. Further, it is possible to combine appropriately the constituting factors included in different embodiments of the present invention.

According to the present embodiment, it is possible to provide a silicon nitride sintered body exhibiting a high oxidation resistance while maintaining a high mechanical strength, a high heat resistance, and a high heat conductivity. It is also possible to provide a silicon nitride structural element comprising the silicon nitride sintered body noted above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A silicon nitride sintered body exhibiting a high heat conductivity, the silicon nitride sintered body containing a rare earth element in an amount of 2 to 17.5 mass % in terms of the oxide thereof, Fe in an amount of 0.07 to 0.5 mass % in terms of the oxide thereof, Ca in an amount of 0.07 to 0.5 mass % in terms of the oxide thereof, Al in an amount of 0.1 to 0.6 mass % in terms of the oxide thereof, Mg in an amount of 0.3 to 4 mass % in terms of the oxide thereof, and Hf in an amount not larger than 5 mass % (including 0 mass %) in terms of the oxide thereof.

2. The silicon nitride sintered body exhibiting a high heat conductivity according to claim 1, which has a heat conductivity not lower than 65 W/m·K, and a three point bending strength at room temperature not lower than 700 MPa, and has a porosity not higher than 2 volume %.

3. The silicon nitride sintered body exhibiting a high heat conductivity according to claim 1, wherein a deterioration rate of a room temperature strength after an oxidizing treatment for 1000 hours within a stationary air of 800 to 1,000° C. is not higher than 10%.

4. The silicon nitride sintered body exhibiting a high heat conductivity according to claim 1, which comprises a crystalline grain boundary phase in an amount of not smaller than 20% of a grain boundary phase.

5. The silicon nitride sintered body exhibiting a high heat conductivity according to claim 1, which comprises a grain boundary phase containing a compound having a rare earth element, Si, Al, Fe, Ca, Mg and O and/or a compound having a rare earth element, Si, Al, Fe, Ca, Mg, O and N.

6. The silicon nitride sintered body exhibiting a high heat conductivity according to claim 5, wherein the rare earth element is at least one kind of element selected from the group consisting of Y, Er and Yb.

7. The silicon nitride sintered body exhibiting a high heat conductivity according to claim 1, wherein the rare earth element is contained in the silicon nitride sintered body in an amount of 3 to 12.5 mass % in terms of the oxide thereof.

8. The silicon nitride sintered body exhibiting a high heat conductivity according to claim 1, wherein Fe is contained in the silicon nitride sintered body in an amount of 0.07 to 0.45 mass % in terms of the oxide thereof.

9. The silicon nitride sintered body exhibiting a high heat conductivity according to claim 1, wherein Ca is contained in the silicon nitride sintered body in an amount of 0.07 to 0.45 mass % in terms of the oxide thereof.

10. The silicon nitride sintered body exhibiting a high heat conductivity according to claim 1, wherein Al is contained in the silicon nitride sintered body in an amount of 0.1 to 0.4 mass % in terms of the oxide thereof.

11. The silicon nitride sintered body exhibiting a high heat conductivity according to claim 1, wherein Mg is contained in the silicon nitride sintered body in an amount of 0.5 to 3 mass % in terms of the oxide thereof.

12. The silicon nitride sintered body exhibiting a high heat conductivity according to claim 1, wherein Hf is contained in the silicon nitride sintered body in an amount of 0.2 to 5 mass % in terms of the oxide thereof.

13. A silicon nitride structural element comprising a silicon nitride sintered body exhibiting a high heat conductivity, the silicon nitride sintered body containing a rare earth element in an amount of 2 to 17.5 mass % in terms of the oxide thereof, Fe in an amount of 0.07 to 0.5 mass % in terms of the oxide thereof, Ca in an amount of 0.07 to 0.5 mass % in terms of the oxide thereof, Al in an amount of 0.1 to 0.6 mass % in terms of the oxide thereof, Mg in an amount of 0.3 to 4 mass % in terms of the oxide thereof, and Hf in an amount not larger than 5 mass % (including 0 mass %) in terms of the oxide thereof.

* * * * *